(12) United States Patent
Kormann (10) Patent No.: US 9,113,588 B2
(45) Date of Patent: Aug. 25, 2015

(54) TRACKING SYSTEM CONFIGURED TO DETERMINE A PARAMETER FOR USE IN GUIDING AN IMPLEMENT ATTACHED TO A WORK MACHINE

(75) Inventor: Georg Kormann, Zweibrücken (DE)

(73) Assignee: DEERE & COMPANY, Moline, IL (US)

( * ) Notice: Subject to any disclaimer, the term of this patent is extended or adjusted under 35 U.S.C. 154(b) by 2194 days.

(21) Appl. No.: 11/639,555

(22) Filed: Dec. 15, 2006

(65) Prior Publication Data
US 2008/0147282 A1 Jun. 19, 2008

(51) Int. Cl.
*G06F 19/00* (2011.01)
*G01S 19/14* (2010.01)
*A01B 69/00* (2006.01)
*G01S 19/51* (2010.01)

(52) U.S. Cl.
CPC ............... *A01B 69/003* (2013.01); *G01S 19/14* (2013.01); *G01S 19/51* (2013.01)

(58) Field of Classification Search
None
See application file for complete search history.

(56) References Cited

U.S. PATENT DOCUMENTS

| | | | | |
|---|---|---|---|---|
| 5,548,516 | A * | 8/1996 | Gudat et al. | 701/23 |
| 5,612,864 | A * | 3/1997 | Henderson | 700/59 |
| 5,764,511 | A * | 6/1998 | Henderson | 700/66 |
| 5,784,029 | A | 7/1998 | Geier | |
| 5,928,295 | A | 7/1999 | Geier | |
| 5,935,183 | A * | 8/1999 | Sahm et al. | 701/50 |
| 5,951,613 | A * | 9/1999 | Sahm et al. | 701/50 |
| 6,119,786 | A * | 9/2000 | Creger et al. | 172/7 |
| 6,434,462 | B1 * | 8/2002 | Bevly et al. | 701/50 |
| 6,804,587 | B1 * | 10/2004 | O Connor et al. | 701/26 |
| 6,865,465 | B2 * | 3/2005 | McClure | 701/50 |
| 7,031,725 | B2 * | 4/2006 | Rorabaugh | 455/456.1 |
| 7,142,956 | B2 * | 11/2006 | Heiniger et al. | 701/23 |
| 7,383,114 | B1 * | 6/2008 | Lange et al. | 701/50 |
| 7,388,539 | B2 * | 6/2008 | Whitehead et al. | 342/357.36 |
| 7,460,942 | B2 * | 12/2008 | Mailer | 701/50 |
| 7,580,783 | B2 * | 8/2009 | Dix | 701/50 |
| 7,689,354 | B2 * | 3/2010 | Heiniger et al. | 701/412 |
| 7,962,266 | B2 * | 6/2011 | Nelson et al. | 701/50 |
| 2003/0187577 | A1 * | 10/2003 | McClure et al. | 701/213 |
| 2003/0208311 | A1 * | 11/2003 | McClure | 701/50 |
| 2004/0111202 | A1 | 6/2004 | Mailer | |
| 2004/0124605 | A1 * | 7/2004 | McClure et al. | 280/456.1 |
| 2004/0212533 | A1 * | 10/2004 | Whitehead et al. | 342/357.08 |

(Continued)

OTHER PUBLICATIONS

Smith, L. A. et al. 1985. "Control Algorithms for Tractor-Implement Guidance". Transactions of the ASAE 28(2) p. 415-419.

(Continued)

*Primary Examiner* — Jason Holloway
*Assistant Examiner* — Jonathan L Sample (57) ABSTRACT

A tracking system employs at least one parameter for use in guiding an implement attached to a work machine, and includes a first global positioning system (GPS) receiver mounted on the work machine; a second GPS receiver mounted on the implement; and a controller configured to execute program instructions to determine the at least one parameter for use in guiding the implement, including: directing the work machine along a predetermined path; obtaining first position data from the first GPS receiver during the directing the work machine; obtaining second position data from the second GPS receiver during the directing the work machine; and determining the at least one parameter based on the first position data and the second position data.

27 Claims, 6 Drawing Sheets

(56) References Cited

U.S. PATENT DOCUMENTS

| | | |
|---|---|---|
| 2004/0217575 A1 | 11/2004 | Beaujot et al. |
| 2005/0015189 A1 | 1/2005 | Posselius et al. |
| 2005/0197756 A1* | 9/2005 | Taylor et al. .................... 701/50 |
| 2006/0042810 A1* | 3/2006 | Pecchio ........................ 172/781 |
| 2006/0142936 A1* | 6/2006 | Dix ............................... 701/200 |
| 2006/0178820 A1 | 8/2006 | Eglington et al. |
| 2006/0282205 A1* | 12/2006 | Lange ............................ 701/50 |
| 2007/0021913 A1* | 1/2007 | Heiniger et al. ............. 701/213 |
| 2007/0088482 A1* | 4/2007 | Mailer ............................ 701/50 |
| 2008/0004778 A1* | 1/2008 | Rekow ........................... 701/50 |
| 2008/0109141 A1* | 5/2008 | Nichols et al. ................. 701/50 |
| 2008/0147282 A1* | 6/2008 | Kormann ........................ 701/50 |

OTHER PUBLICATIONS

Larsen, W. E. et al. 1994. "Precision navigation with GPS". Computers and Electronics in Agriculture, vol. 11, 1994, pp. 85-95.

Bevly, David M. et al. "Carrier-Phase Differential GPS for Control of a Tractor Towed Implement". Proceedings of the 2000 ION-GPS Meeting, Salt Lake City, Utah, Sep. 2000.

European Search Report dated Sep. 16, 2013 (6 pages).

* cited by examiner

TRACKING SYSTEM CONFIGURED TO DETERMINE A PARAMETER FOR USE IN GUIDING AN IMPLEMENT ATTACHED TO A WORK MACHINE

FIELD OF THE INVENTION

The present invention relates to work machines, and more particularly, to a tracking system configured to determine a parameter for use in guiding an implement attached to a work machine.

BACKGROUND OF THE INVENTION

In the agricultural industry, farming is typically performed using a work machine, such as a tractor, that pulls an implement to work the fields, e.g., for plowing, planting, fertilizing, spraying, and harvesting.

Improvements in crop yield and farming efficiency, as well as reductions in operator fatigue, have been achieved by use of the Global Position System (GPS), which is used to guide the tractor and implement in an efficient manner throughout the fields, for example, reducing the skipping or overlapping of locations in the field, as well as providing the capability to return to a particular location to recommence operations after having depleted onboard supplies, e.g., of seed, fertilizer, and the like, at that location.

Both the tractor and the implement may have mounted thereon a GPS receiver, such as a Star-Fire® position receiver, offered by Deere & Co., which are used to guide the tractor and the implement, and which may provide geopositional data as part of a tracking system, such the as Greenstar® system offered by Deere & Co. Such tracking systems may provide automatic steering or guidance for manual steering via a display, so that the locations of the tractor and implement are controlled precisely.

In order to accurately guide the implement using such a tracking system, it is desirable to know several important parameters. One set of such parameters pertains to the tractor, and includes the distance between the tractor's GPS receiver location and hitch point, and the distance between the hitch point and the tractor's control point (the point about which the tractor turns). These tractor-related parameters are generally known to the operator, for example, having been provided by the manufacturer of the tractor. Another set of such parameters are implement-related parameters, such as the distance between the hitch point (the point where the implement is pivotably attached to the tractor) and the implement-mounted GPS receiver, as well as the distance between the hitch point and the control point of the implement (the point about which the implement turns). Presently, implement-related parameters are typically determined by the operator of the equipment, who must then manually enter the distance data into the tracking system.

However, the implement-related parameters may be difficult to obtain, resulting in inconvenience to the operator. In particular, the implement-related parameters as determined by the operator may also be inaccurate, since the location of the control point of the implement may vary greatly, depending on a range of factors. For example, the control point location may depend on the degree of ground penetration/engagement of the implement, which may vary with soil conditions and the overall weight or ballasting of the implement. The overall weight of the implement may itself vary based on such factors as an amount of fertilizer or other soil/crop treatment loaded onto the implement, which is subsequently depleted during farming operations.

Accordingly, it is desirable to accurately and conveniently determine implement-related parameters for use with a tracking system.

SUMMARY OF THE INVENTION

The present invention provides a tracking system configured to determine at least one parameter for use in guiding an implement attached to a work machine.

The invention, in one form thereof, is directed to a tracking system employing at least one parameter for use in guiding an implement attached to a work machine. The tracking system includes a first global positioning system (GPS) receiver mounted on the work machine; a second GPS receiver mounted on the implement; and a controller configured to execute program instructions to determine the at least one parameter for use in guiding the implement, including: directing the work machine along a predetermined path; obtaining first position data from the first GPS receiver during the directing of the work machine; obtaining second position data from the second GPS receiver during the of directing the work machine; and determining the at least one parameter based on the first position data and the second position data.

The invention, in another form thereof, is directed to a work machine configured to attach an implement thereto. The work machine includes a drive system for driving the work machine; a steering system for steering the work machine; and a tracking system employing at least one parameter for use in guiding the implement. The tracking system includes a first global positioning system (GPS) receiver mounted on the work machine; a second GPS receiver mounted on the implement; and a controller configured to execute program instructions to determine the at least one parameter for use in guiding the implement, including: directing the work machine along a predetermined path; obtaining first position data from the first GPS receiver during the directing of the work machine; obtaining second position data from the second GPS receiver during the directing of the work machine; and determining the at least one parameter based on the first position data and the second position data.

The invention, in yet another form thereof, is directed to a method for determining at least one parameter for use by a tracking system in guiding an implement attached to a work machine. The method includes directing the work machine along a predetermined path; obtaining first position data from a first GPS receiver during the directing of the work machine; obtaining second position data from a second GPS receiver during the directing of the work machine; and determining the at least one parameter based on the first position data and the second position data.

DETAILED DESCRIPTION OF THE INVENTION

Figure 1:
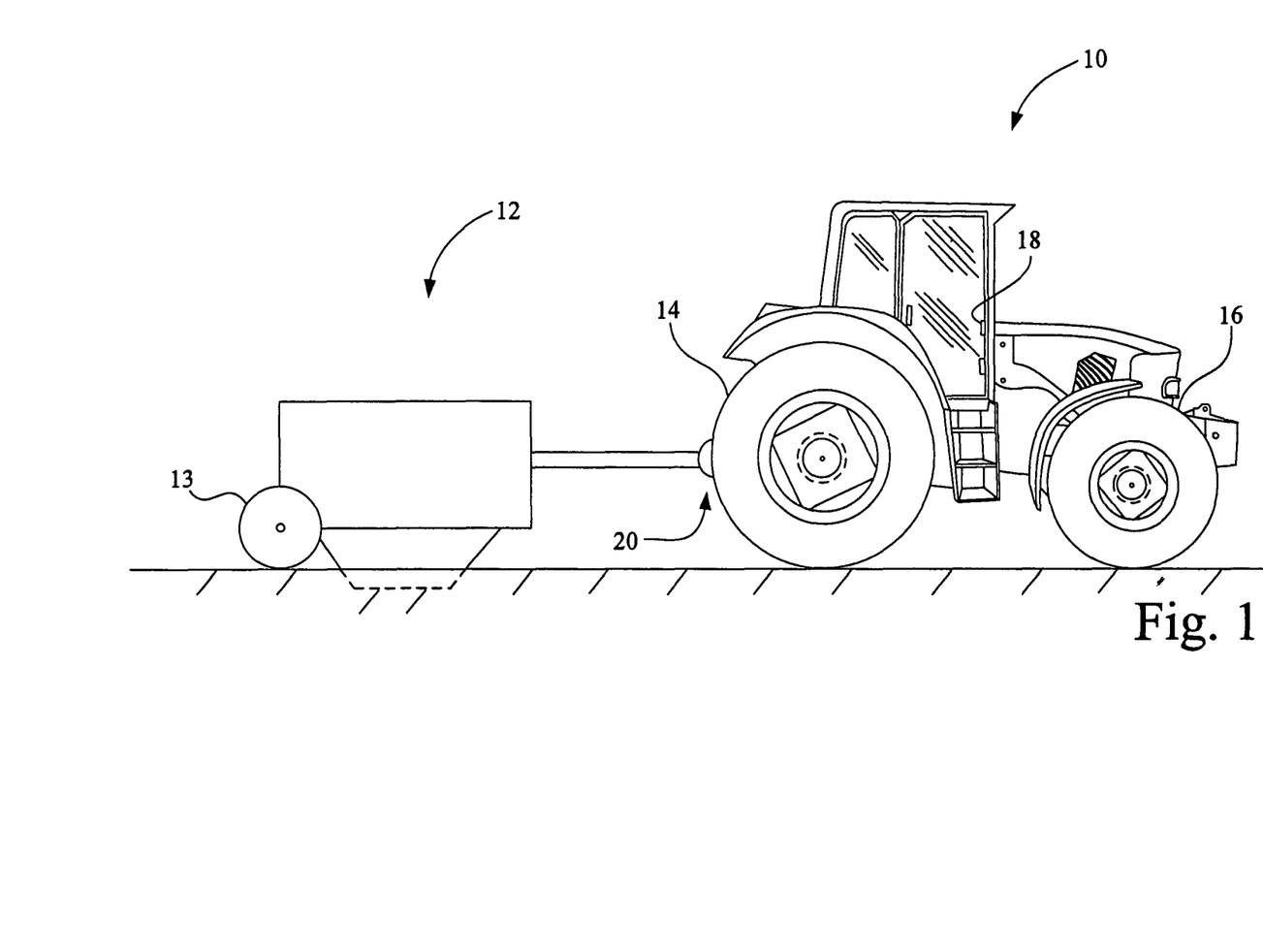
FIG. 1 depicts a work machine having an implement attached thereto in accordance with an embodiment of the present invention.

Referring now to FIG. 1, there is shown a work machine 10 having an implement 12 attached thereto in accordance with an embodiment of the present invention. Work machine 10 is employed for performing work, such as agricultural work, and may be wheel driven having conventional or articulated steering and/or track driven. In the present embodiment, work machine 10 is a wheel driven tractor.

Work machine 10 includes a drive system 14, a steering system 16, a tracking system 18, and a hitch 20. Work machine is configured to attach implement 12 via hitch 20, and to pull implement 12 behind work machine 10 for performing farming operations.

Drawn implement 12 is a farming implement, such as an air seeder, a drawn planter, a disc, a strip tiller, a row unit, a box drill, a cultivator, a finisher, a plow, a ripper, or may be any implement used in conducting farming operations, and may include support wheels 13 that is used in transporting implement 12 to and from the field, but which carries little or no load during field operations. Alternatively, it is contemplated that in other embodiments, drawn implement 12 may be a construction implement, for example, a scaper.

Drive system 14 includes an engine, a transmission, axles, wheels, and tires, and provides tractive effort for driving work machine 10. Steering system 16 is for steering work machine 10 when work machine 10 is driven by drive system 14.

Tracking system 18 is for guiding work machine 10 and, more particularly, implement 12, during farming operations, such as planting, tilling, fertilizing, and spraying. In one embodiment, tracking system 18 includes automatic steering system components (not shown) that automatically direct work machine 10 via steering system 16 through fields for performing farming operations. In another embodiment tracking system 18 may provide guidance to the operator of work machine 10 via a display, who manually steers work machine 10 using steering system 16, based on input provided by tracking system 18. Tracking system 18 may enhance the efficiency of farming operations, for example, by guiding work machine 10 and implement 12 through the fields to reduce the skipping and overlapping of locations in the field, by providing information allowing the operator to adjust the amount of seed, fertilizer, etc., dispersed by implement 12 based on the characteristics of particular farmed areas, and by providing the capability to return to a particular location to recommence operations after having depleted implement 12 onboard supplies, e.g., of seed, fertilizer, and the like, at that location.

Figure 2:
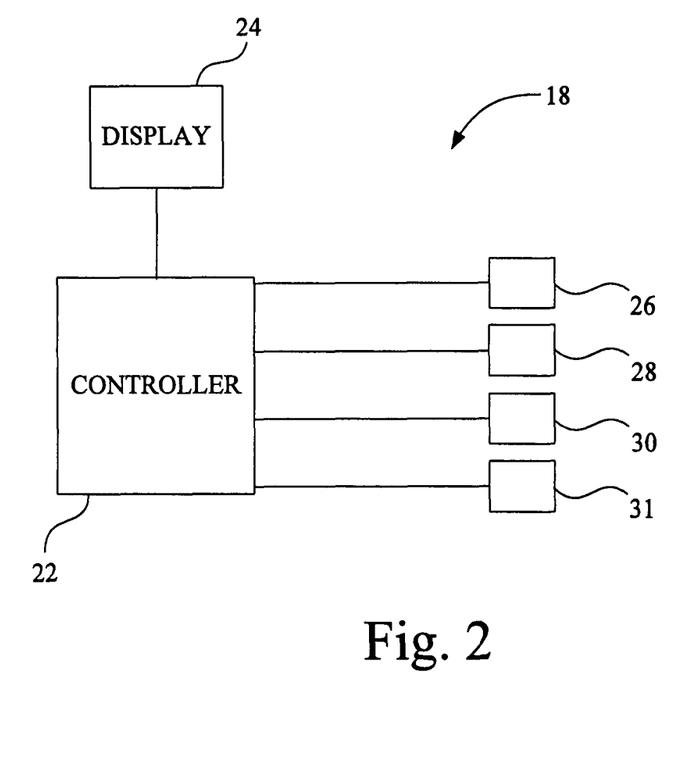
FIG. 2 depicts a tracking system in accordance with an embodiment of the present invention.

Referring now to FIG. 2, tracking system 18 includes a controller 22, a display 24, a global positioning system (GPS) receiver 26, a GPS receiver 28, a terrain compensation module 30, and a terrain compensation module 31. Terrain compensation module 30 is mounted on work machine 10, and terrain compensation module 31 is mounted on implement 12. Controller 22 performs calculations based on position data received from GPS receiver 26 and GPS receiver 28, and on roll, pitch and yaw data received from terrain compensation modules 30 and 31, and uses this data to establish the position of work machine 10 and implement 12. Controller 22 also employs this data to guide work machine 10 during farming operations so as to place and retain implement 12 in a desired position and/or along a desired path. For example, in one embodiment, controller 22 provides data employed by tracking system 18 to automatically steer work machine 10, whereas in another embodiment, controller 22 provides data to display 24 to display the current position of work machine 10 relative to a desired position of work machine 10, allowing the operator to steer work machine 10 into the desired position. In either case, work machine 10 is guided by the use of tracking system 18 so as to accurately position implement 12 during the farming operations.

GPS receiver 26 is mounted on work machine 10, whereas GPS receiver 28 is mounted on implement 12. Each of GPS receivers 26 and 28 provide geographic position data to controller 22 for use in establishing the positions of work machine 10 and implement 12.

Terrain compensation module 30 provides roll, pitch, and yaw data to controller 22 to correct the position data obtained by GPS receiver 26, and terrain compensation module 31 provides roll, pitch, and yaw data to controller 22 to correct data obtained by GPS receiver 28. For example, since each of GPS receiver 26 and GPS receiver 28 are located by some distance above the ground, a sloping terrain will shift the positions of GPS receiver 26 and GPS receiver 28, thereby providing an error in the positions of work machine 10 and implement 12 as determined based solely on data from GPS receiver 26 and GPS receiver 28, respectively. In order to provide correction to such position data, terrain compensation modules 30 and 31 provide data pertaining to the roll, pitch, and yaw angles of work machine 10 and implement 12, respectively, caused by variations in terrain, which is employed to correct the position data obtained via GPS receiver 26 and GPS receiver 28.

Figure 3:
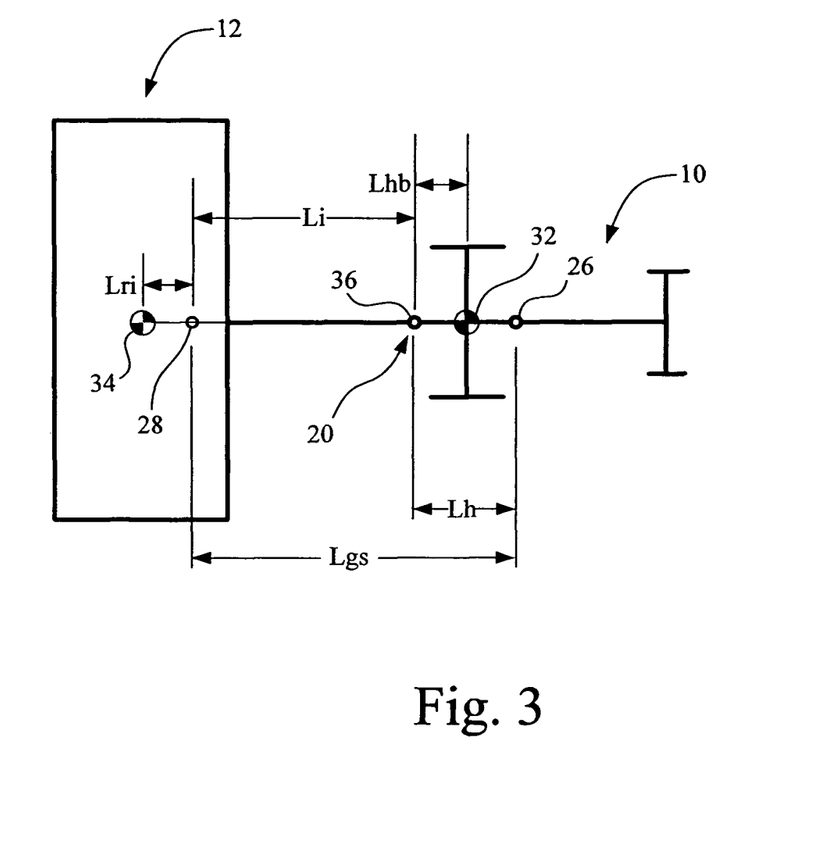
FIG. 3 is schematic diagram of the work machine and implement of FIG. 1, which illustrates parameters associated with the work machine and the implement in accordance with an embodiment of the present invention.

Referring now to FIG. 3, a schematic diagram of work machine 10 and implement 12 attached thereto is depicted, including parameters employed by tracking system 18 for use in guiding implement 12.

In order for tracking system 18 to direct work machine 10 and implement 12 accurately, certain parameters should be known by tracking system 18, and terrain compensation modules 30 and 31 should be calibrated. For example, work machine 10 has a control point 32 about which work machine 10 rotates when turning, and implement 12 has a control point 34 about which implement 12 rotates when turning. That is, when the operator of work machine 10 employs steering system to change the direction of work machine 10, the change in direction results in work machine 10 rotating about control point 32. Similarly, if the direction of motion of work machine 10 is changed while pulling implement 12, implement 12 rotates about control point 34.

Implement 12 is pivotable about a hitch point 36 adjacent hitch 20 when implement is attached to work machine 10 via hitch 20. When changing the direction of work machine 10, implement 12 pivots about hitch point 36. The location of hitch point 36 depends on the geometry of the particular hitch 20, but generally resides at the center of the primary hitch pin that secures implement 12 to work machine 10.

In order to accurately guide implement 12, tracking system 18 requires the use of various parameters relating to the geometry and operation of work machine 10 and implement 12. For example, tracking system 18 requires data pertaining to the distance Lh between GPS receiver 26 and hitch point 36, the distance Lhb between control point 32 and hitch point 36, the distance Li between GPS receiver 28 and hitch point 36, and the distance Lri between control point 34 and GPS receiver 28. Distance Lgs, depicted in FIG. 3, represents the distance between GPS receiver 26 and GPS receiver 28 when work machine 10 is driven in a straight line, and hence may be referred to as a straight line distance. Distance Lgs is the maximum distance between GPS receiver 26 and GPS receiver 28 when implement 12 is attached to work machine 10 via hitch 20.

However, the above-mentioned parameters may not be readily obtainable. While distances Lh and Lhb may be supplied by the manufacturer of work machine 10, the distances Lri and Li may be difficult to obtain, and generally require that the operator of work machine 10 take measurements, and then manually input the measurement data into tracking system 18. However, manual measurement is inconvenient, and may also be inaccurate. For example, GPS receiver 28 may not be installed in a readily accessible location, and it may be inconvenient for the operator to climb about implement 12 in order to measure distance Li. More particularly, control point 34 may not be accurately known unless implement 12 has a single axle. However, many implements represented by implement 12 may only have support wheels 13 that carry little or no load during field operations, or may have more than one axle. In addition, where implement 12 is a ground engaging/penetrating implement, the location of control point 34 varies with respect to the soil conditions and also the weight of the implement. The weight of the implement can itself vary based on implement ballast usage and based on the amount of crop treatment loaded into the implement, which may also change as the crop treatment becomes depleted during its application to the field.

Figure 4:
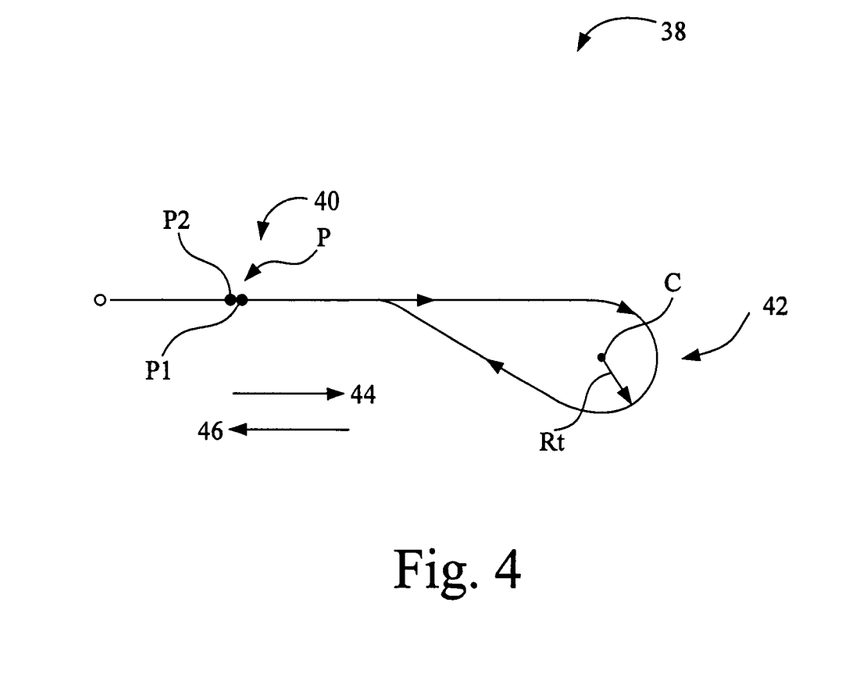
FIG. 4 depicts an example of a predetermined path along which the work machine of FIG. 1 may be directed in determining the parameters for the tracking system.

Referring now to FIG. 4, controller 22 is configured to execute program instructions to determine at least one parameter for use in guiding implement 12, including directing work machine 10 along a predetermined path 38, obtaining first position data from GPS receiver 26 while work machine is directed along the predetermined path, obtaining second position data from GPS receiver 28 while work machine 10 is directed along the predetermined path, and determining the at least one parameter based on the first position data and the second position data. In particular, the present invention employs tracking system 18 to determine the location of control point 34, distance Lri, and distance Li.

By using the term, "execute program instructions," it will be understood that controller 22 may execute programmed instructions in the form of software, firmware, or hardware stored in or accessed by tracking system 18, but may also include any other digital or analog implementation configured to make the determinations herein described based on data provided by GPS receiver 26, GPS receiver 28, and data input into tracking system 18, for example, by the operator of work machine 10.

In the present embodiment, the operator of work machine 10 inputs distance Lh between GPS receiver 26 and hitch point 36 and distance Lhb between control point 32 and hitch point 36, for example, using display 24, which are received by tracking system 18 for use in determining the balance of the parameters.

Predetermined path 38 includes a straight segment 40 and a curved segment 42 having a known radius Rt to a center C of curved segment 42. Control point 32 of work machine 10 lies on radius Rt when work machine 10 is directed along curved segment 42, and hence, Radius Rt is the radius to control point 32 from the center C of curved segment 42.

Tracking system 18 determines the parameters for use in guiding implement 12 by directing work machine 10 along both straight segment 40 and curved segment 42. Position data is obtained from GPS receiver 26 and GPS receiver 28 when work machine is being directed along both straight segment 40 and curved segment 42.

Figure 5:
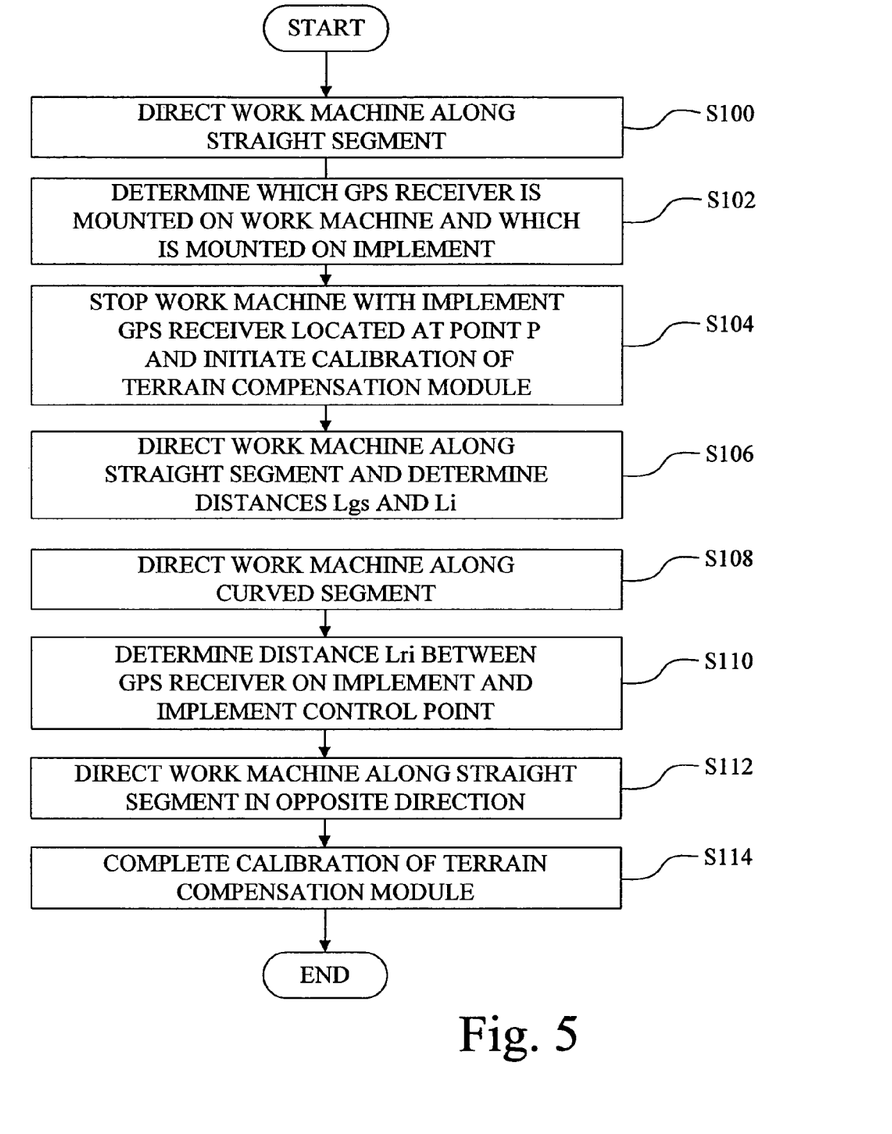
FIG. 5 is a flowchart depicting a method for determining at least one parameter for use by a tracking system in guiding an implement attached to a work machine in accordance with an embodiment of the present invention.

Referring now to FIG. 5, in conjunction with FIG. 4, a method for determining the parameters for use by tracking system 18 in guiding implement 12 is depicted.

At step S100, controller 22 directs work machine 10 along straight segment 40 in a direction 44. During step S100, work machine 10 and implement 12 are brought into a straight alignment with respect to each other, that is, the system of work machine 10 and implement 12 are brought into a straight position, aligned in direction 44. Controller 22 obtains position data from GPS receiver 26 and GPS receiver 28, for example, to subsequently determine which GPS receiver 26 or 28 is mounted to work machine 10, and which GPS receiver 26 or 28 is mounted to implement 12, as well as for use in determining the distance Lgs between GPS receiver 26 and GPS receiver 28.

At step S102, using the data obtained during step S100, controller 22 determines which of the two GPS receivers 26 and 28 is mounted on work machine 10 and which is mounted on implement 12, i.e., establishes for purposes of tracking system 18 that GPS receiver 26 is mounted on work machine 10, and that GPS receiver 28 is mounted on implement 12, generally by determining which receiver is in front.

At step S104, work machine 10 is stopped with GPS receiver 26 located at a point P1 and GPS receiver 28 located at point P2 on straight segment 40 of predetermined path 38, and the calibration of terrain compensation modules 30 and 31 is initiated, at which time roll, pitch, and yaw data is taken from terrain compensation modules 30 and 31. Points P1 and P2 are selected on level ground, and are adjacent each other, separated only by the distance between work machine 10 and implement 12, and may hence be referred to collectively as point P.

As set forth below, in order to calibrate terrain compensation modules 30 and 31, controller 22 obtains position data while work machine 10 and implement 12 are at point P and directed in direction 44 (this data is obtained from each GPS receiver, and forms a subset of the total amount position data acquired by each GPS receiver). Controller 22 then directs work machine 10 from point P along straight segment 40 in a direction 44; directs work machine 10 back along straight segment 40 to point P in a direction 46 that is opposite direction 44; obtains position data (second subsets of data from each GPS receiver) while work machine 10 is at point P and directed in direction 46; and determines a calibration for terrain compensation module 30 based on the position data obtained while at point P in both directions 44 and 46. The calibration is based on the roll, pitch, and yaw angles of work machine 10 and implement 12 when at point P, and the height of the GPS receivers.

At step S106, controller 22 again directs work machine 10 along straight segment 40, during which time controller 22 also obtains position data from GPS receiver 26 and GPS receiver 28 (in addition to the position data obtained from GPS receiver 26 and GPS receiver 28 obtained at step S100).

Controller 22 determines distance Lgs between GPS receiver 26 and GPS receiver 28 based on averaging the position data obtained from GPS receivers 26 and 28 while work machine 10 is directed along straight segment 40. Controller 22 then determines distance Li between GPS receiver 28 and hitch point 36 based also on distance Lh between hitch point 36 and GPS receiver 26. Distance Li may be described thusly by Equation 1:

$$Li = Lgs - Lh \qquad \text{Equation 1}$$

Equation 1 describes that the hitch point 36 and GPS receiver 26 is based on straight line distance Lgs between GPS receiver 26 and GPS receiver 28, and based on distance Lh between hitch point 36 and GPS receiver 26.

At step S108, controller 22 directs work machine 10 along curved segment 42 at radius Rt, and obtains position data from GPS receiver 26 and GPS receiver 28 while directing work machine 10 along known radius Rt. Radius Rt may be any radius that work machine 10 and implement 12 are capable of jointly following. Alternatively, curved segment 42 may include a pattern of radii that work machine 10 and implement 12 are directed along. Radius Rt is the radius to control point 32 from the center C of curved segment 42.

Figure 6:
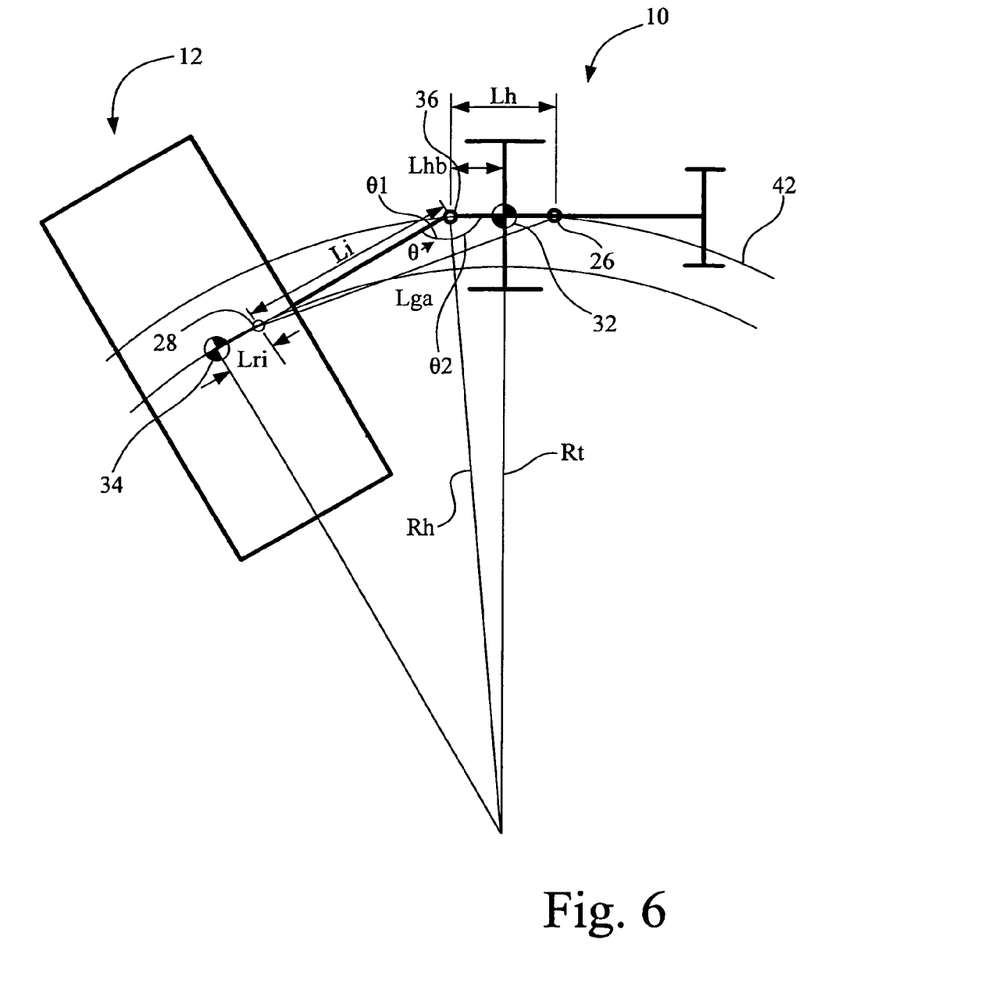
FIG. 6 depicts a work machine with an attached implement following a curved segment of the predetermined path of FIG. 4, and illustrates the parameters associated with the work machine and the implement in accordance with an embodiment of the present invention.

Referring now to FIG. 6, which depicts work machine 10 and implement 12 while being directed along curved segment 42, in conjunction with FIGS. 3 and 5, the present description is continued.

At step S110, controller 22 determines distance Lri between control point 34 and GPS receiver 28 based on the position data obtained from GPS receiver 26 and GPS receiver 28 while work machine 10 is directed along known radius Rt, and based on radius Rt.

In the present embodiment, the distance Lri between control point 34 and GPS receiver 28 is determined as follows:

A radius Rh from the center C of curved segment 42 to hitch point 36 is determined based on known radius Rt, and based on distance Lhb between hitch point 36 and control point 32. Radius Rh may be described thusly by Equation 2:

$$Rh = \sqrt{Lhb^2 + Rt^2} \quad \text{Equation 2}$$

Then, an angle E between work machine 10 and implement 12 is determined based on a distance Lga between GPS receiver 26 and GPS receiver 28 while work machine 10 is directed along known radius Rt, based on distance Li between GPS receiver 28 and hitch point 36, e.g., as determined according to Equation 1, and based on distance Lh between hitch point 36 and GPS receiver 26.

Distance Lga is determined by controller 22 based on positional data obtained from GPS receiver 26 and GPS receiver 28 while work machine 10 is directed along known radius Rt.

Angle θ may be described thusly by Equation 3:

$$\theta = \cos^{-1}\left(\frac{Lga^2 - Li^2 - Lh^2}{-2LiLh}\right) \quad \text{Equation 3}$$

An angle θ2 between work machine 10 and radius Rh is then determined, based on known radius Rt, and based on distance Lhb between hitch point 36 and control point 32, and may be described thusly by Equation 4:

$$\theta 2 = \tan^{-1}\left(\frac{Rt}{Lhb}\right) \quad \text{Equation 4}$$

An angle θ1 between implement 12 and radius Rh is then determined. Angle θ1 may be described thusly by Equation 5:

$$\theta 1 = \theta - \theta 2 = \cos^{-1}\left(\frac{Lga^2 - Li^2 - Lh^2}{-2LiLh}\right) - \tan^{-1}\left(\frac{Rt}{Lhb}\right) \quad \text{Equation 5}$$

Distance Lri between control point 34 and GPS receiver 28 is then determined. Distance Lri may be described in simplified form by Equation 6, or in long form by Equation 7:

$$Lri = Rh\cos\theta 1 - Li \quad \text{Equation 6}$$

$$Lri = \sqrt{Lhb^2 + Rt^2}\cos\left[\cos^{-1}\left(\frac{Lga^2 - Li^2 - Lh^2}{-2LiLh}\right) - \tan^{-1}\left(\frac{Rt}{Lhb}\right)\right] - Li \quad \text{Equation 7}$$

Having thus determined distance Lri, controller 22 employs Lri for use in guiding implement 12 in performing farming operations.

At step S112, controller 22 directs work machine 10 along straight segment 40 in opposite direction 46. With work machine 10 and implement 12 directed in direction 46, the work machine/implement pair is now 180 degrees from the heading followed in steps S100 and S106 (direction 44).

At step S114, work machine 10 is stopped on straight segment 40 of predetermined path 38 with GPS receiver 26 located at point P1 first, at which time roll, pitch, and yaw data is taken from terrain compensation module 30, and again with GPS receiver 28 located at point P2, at which time roll, pitch, and yaw data is taken from terrain compensation module 31. The roll, pitch, and yaw data thus obtained at step S114, along with the roll, pitch, and yaw data obtained at step S104, is used to complete the calibration of terrain compensation modules 30 and 31 to compensate for the effect of terrain induced roll, pitch, and yaw on the position of GPS receivers 26 and 28, respectively.

For example, as set forth above in step S102, the calibration of terrain compensation module 30 is based on the roll, pitch, and yaw angles of work machine 10 and implement 12 when at points P1 and P2, respectively, and the height of the GPS receivers 26 and 28 above ground level. The height of the receivers above the ground causes an offset in GPS receiver position due to the roll, pitch, and yaw angles caused by a sloped ground surface. By obtaining position data from GPS receiver 26 and GPS receiver 28 while work machine 10 and implement 12 are aligned in direction 44 and located at points P1 and P2, respectively, and also obtaining position data from GPS receiver 26 and GPS receiver 28 while work machine 10 and implement 12 are aligned in opposite direction 46 while at the same locations (points P1 and P2, respectively), an in conjunction with corresponding roll, pitch, and yaw angle data supplied by terrain compensation modules 30 and 31 for each direction, the effect of roll, pitch, and yaw angles on the position of GPS receiver 26 and GPS receiver 28 is determined, and is subsequently employed by tracking system 18 in guiding work machine 10 and implement 12.

Although the present embodiment describes the use of an implement 12 attached to work machine 10, more than one implement 12 may be employed without departing from the scope of the present invention. For example, multiple implements may be connected in daisy chain fashion; it will be understood that the invention described herein is equally applicable to determining the parameters necessary to guide each such implement, for example, parameters relating to the relative locations of the control point, GPS receiver location, and hitch point of each such implement.

By determining the parameters for tracking system 18 and also calibrating terrain compensation module in one operation, for example, as set forth above in steps S100-S114, the time, expense, fuel consumption, and inconvenience associated with performing multiple operations, e.g., one operation for determining the parameters and another separate operation for calibrating terrain compensation modules 30 and 31, may be avoided.

In addition, the same determinations may also be performed during system operation, i.e., during actual farming operations, for fine tuning of the location of control point 34 and to compensate for varying soil and ballasting conditions of implement 12.

Having described the preferred embodiment, it will become apparent that various modifications can be made without departing from the scope of the invention as defined in the accompanying claims.

The invention claimed is:

1. A tracking system employing a plurality of parameters for use in guiding an implement attached to a work machine, said tracking system comprising:
   a first global positioning system (GPS) receiver mounted on said work machine;
   a second GPS receiver mounted on said implement; and
   a controller configured to execute program instructions to determine the parameters for use in guiding said implement, the parameters comprising a first distance and a second distance, the first distance between said first GPS receiver and said second GPS receiver, the program instructions comprising:
   directing said work machine along a straight segment of a predetermined path while determining the second distance between a hitch point of the work machine and said second GPS receiver based on the first distance and a supplied known distance between the hitch point and the first GPS receiver;
   obtaining first position data from said first GPS receiver during said directing said work machine;
   obtaining second position data from said second GPS receiver during said directing said work machine;
   determining a control point of the work machine, where the control point lies on a radius of a curved segment when the work machine is directed along the curved segment and where the control point is spaced apart from the hitch point; and
   determining said parameters based on said first position data and said second position data, wherein said controller is configured to execute said program instructions to determine said first distance between said first GPS receiver and said second GPS receiver based on said first position data and said second position data.

2. The tracking system of claim 1, wherein said controller is configured to execute said program instructions to determine that said first GPS receiver is mounted on said work machine and that said second GPS receiver is mounted on said implement, based on said first position data and said second position data.

3. The tracking system of claim 1, said work machine having a hitch for attaching said implement, said implement being pivotable about the hitch point adjacent said hitch when said implement is attached to said work machine via said hitch, wherein:
   the known distance between said hitch point and said first GPS receiver is received by said tracking system; and
   said controller is configured to execute said program instructions to determine said second distance between said hitch point and said second GPS receiver based on said first position data, said second position data, and said known distance between said hitch point and said first GPS receiver.

4. The tracking system of claim 3, wherein said controller is configured to execute said program instructions to obtain said first position data and said second position data while directing said work machine along said straight segment.

5. The tracking system of claim 1, said tracking system further comprising a terrain compensation module, wherein:
   said predetermined path includes a straight segment having a point P thereon; and
   said controller is configured to execute said program instructions for:
   obtaining a first subset of said first position data and a first subset of said second position data while said work machine is at said point P and directed in a first direction;
   directing said work machine from said point P along said straight segment in said first direction;
   directing said work machine back along said straight segment to said point P in a second direction opposite said first direction;
   obtaining a second subset of said first position data and a second subset of said second position data while said work machine is at said point P and directed in said second direction; and
   determining a calibration for said terrain compensation module based on said first subset of said first position data, said first subset of said second position data, said second subset of said first position data, and said second subset of said second position data.

6. The tracking system of claim 1, wherein said predetermined path includes a curved segment having a known radius to a center of said curved segment, and wherein said controller is configured to execute said program instructions to obtain said first position data and said second position data while directing said work machine along said known radius.

7. The tracking system of claim 6, said work machine having a first control point about which said work machine rotates when turning, said implement having a second control point about which said implement rotates when turning, wherein:
   said at least one parameter includes a distance between said second GPS receiver and said second control point; and
   said controller is configured to execute said program instructions to determine said distance between said second GPS receiver and said second control point based on said first position data, said second position data, and said known radius.

8. The tracking system of claim 7, wherein said known radius is a radius to said first control point from said center of said curved segment.

9. The tracking system of claim 7, said work machine having a hitch for attaching said implement, said implement being pivotable about a hitch point adjacent said hitch when said implement is attached to said work machine via said hitch, wherein said controller is configured to execute said program instructions to determine:
   a distance between said hitch point and said second GPS receiver, based on a straight line distance between said first GPS receiver and said second GPS receiver, and based on a distance between said first GPS receiver and said hitch point;
   a radius from said center of said curved segment to said hitch point based on said known radius and based on a distance between said hitch point and said first control point;
   a first angle between said work machine and said implement, based on a distance between said first GPS receiver and said second GPS receiver while said work machine is directed along said known radius, based on a distance between said hitch point and said second GPS receiver, and based on a distance between said hitch point and said first GPS receiver; and a second angle between said work machine and said radius, based on said known radius, and based on said a distance between said hitch point and said first control point, wherein said distance between said second GPS receiver and said second control point is determined based on said distance between said hitch point and said second GPS receiver, based on said radius from said center of said curved segment to said hitch point, based on said first angle, and based on said second angle.

10. A work machine configured to attach an implement thereto, comprising:
a drive system for driving said work machine;
a steering system for steering said work machine; and
a tracking system employing at least one parameter, among a plurality of parameters, for use in guiding said implement, said tracking system comprising:
a first global positioning system (GPS) receiver mounted on said work machine;
a second GPS receiver mounted on said implement; and
a controller configured to execute program instructions to determine the parameters for use in guiding said implement, the parameters comprising a first distance and a second distance, the first distance between said first GPS receiver and said second GPS receiver, the program instructions comprising:
directing said work machine along a straight segment of a predetermined path while determining the second distance between a hitch point of the work machine and said second GPS receiver based on the first distance and a supplied known distance between the hitch point and the first GPS receiver;
obtaining first position data from said first GPS receiver during said directing said work machine;
obtaining second position data from said second GPS receiver during said directing said work machine;
determining a control point of the work machine, where the control point lies on a radius of a curved segment when the work machine is directed along the curved segment and where the control point is spaced apart from the hitch point; and
determining said parameters based on said first position data and said second position data, wherein said controller is configured to execute said program instructions to determine said first distance between said first GPS receiver and said second GPS receiver based on said first position data and said second position data.

11. The work machine of claim 10, wherein said controller is configured to execute said program instructions to determine that said first GPS receiver is mounted on said work machine and that said second GPS receiver is mounted on said implement, based on said first position data and said second position data.

12. The work machine of claim 10, said work machine having a hitch for attaching said implement, said implement being pivotable about the hitch point adjacent said hitch when said implement is attached to said work machine via said hitch, wherein:
the known distance between said hitch point and said first GPS receiver is received by said tracking system; and
said controller is configured to execute said program instructions to determine said second distance between said hitch point and said second GPS receiver based on said first position data, said second position data, and said known distance between said hitch point and said first GPS receiver.

13. The work machine of claim 12, wherein said controller is configured to execute said program instructions to obtain said first position data and said second position data while directing said work machine along said straight segment.

14. The work machine of claim 13, said tracking system further including a terrain compensation module, wherein:
said predetermined path includes a straight segment having a point P thereon; and
said controller is configured to execute said program instructions for:
obtaining a first subset of said first position data and a first subset of said second position data while said work machine is at said point P and directed in said a direction;
directing said work machine from said point P along said straight segment in said first direction;
directing said work machine back along said straight segment to said point P in a second direction opposite said first direction;
obtaining a second subset of said first position data and a second subset of said second position data while said work machine is at said point P and directed in said second direction; and
determining a calibration for said terrain compensation module based on said first subset of said first position data, said first subset of said second position data, said second subset of said first position data, and said second subset of said second position data.

15. The work machine of claim 10, wherein said predetermined path includes a curved segment having a known radius to a center of said curved segment, and wherein said controller is configured to execute said program instructions to obtain said first position data and said second position data while directing said work machine along said known radius.

16. The work machine of claim 15, said work machine having a first control point about which said work machine rotates when turning, said implement having a second control point about which said implement rotates when turning, wherein:
said at least one parameter includes a distance between said second GPS receiver and said second control point; and
said controller is configured to execute said program instructions to determine said distance between said second GPS receiver and said second control point based on said first position data, said second position data, and said known radius.

17. The work machine of claim 16, wherein said known radius is a radius to said first control point from said center of said curved segment.

18. The work machine of claim 16, said work machine having a hitch for attaching said implement, said implement being pivotable about a hitch point adjacent said hitch when said implement is attached to said work machine via said hitch, wherein said controller is configured to execute said program instructions to determine:
a distance between said hitch point and said second GPS receiver, based on a straight line distance between said first GPS receiver and said second GPS receiver, and based on a distance between said first GPS receiver and said hitch point;
a radius from said center of said curved segment to said hitch point based on said known radius and based on a distance between said hitch point and said first control point;
a first angle between said work machine and said implement, based on a distance between said first GPS receiver and said second GPS receiver while said work machine is directed along said known radius, based on a distance between said hitch point and said second GPS receiver, and based on a distance between said hitch point and said first GPS receiver; and a second angle between said work machine and said radius, based on said known radius, and based on said a distance between said hitch point and said first control point, wherein said distance between said second GPS receiver and said second control point is determined based on said distance between said hitch point and said second GPS receiver, based on said radius from said center of said curved segment to said hitch point, based on said first angle, and based on said second angle.

19. A method for determining a plurality of parameters for use by a tracking system in guiding an implement attached to a work machine, said method comprising:

obtaining first position data from a first GPS receiver during said directing said work machine;

obtaining second position data from a second GPS receiver during said directing said work machine;

determining said parameters based on said first position data and said second position data, the parameters comprising a first distance and a second distance, the first distance between said first GPS receiver and said second GPS receiver;

directing said work machine along a straight segment of a predetermined path while determining the second distance between a hitch point of the work machine and said second GPS receiver based on the first distance and a supplied known distance between the hitch point and the first GPS receiver;

determining said first distance between said first GPS receiver and said second GPS receiver based on said first position data and said second position data; and determining a control point of the work machine, where the control point lies on a radius of a curved segment when the work machine is directed along the curved segment and where the control point is spaced apart from the hitch point.

20. The method of claim 19, further comprising determining that said first GPS receiver is mounted on said work machine and that said second GPS receiver is mounted on said implement, based on said first position data and said second position data.

21. The method of claim 19, said work machine having a hitch for attaching said implement, said implement being pivotable about a the hitch point adjacent said hitch when said implement is attached to said work machine via said hitch, wherein said at least one parameter includes a second distance between said hitch point and said second GPS receiver, said method further comprising receiving a supplied known distance between said hitch point and said first GPS receiver; and determining said second distance between said hitch point and said second GPS receiver based on said first position data, said second position data, and said known distance between said hitch point and said first GPS receiver.

22. The method of claim 21, said method further comprising obtaining said first position data and said second position data while directing said work machine along said straight segment.

23. The method of claim 19, wherein said tracking system includes a terrain compensation module, and wherein said predetermined path includes a straight segment having a point P thereon, said method further comprising:

obtaining a first subset of said first position data and a first subset of said second position data while said work machine is at said point P and directed in a first direction;

directing said work machine from said point P along said straight segment in said first direction;

directing said work machine back along said straight segment to said point P in a second direction opposite said first direction;

obtaining a second subset of said first position data and a second subset of said second position data while said work machine is at said point P and directed in said second direction; and determining a calibration for said terrain compensation module based on said first subset of said first position data, said first subset of said second position data, said second subset of said first position data, and said second subset of said second position data.

24. The method of claim 19, wherein said predetermined path includes a curved segment having a known radius to a center of said curved segment, said method further comprising obtaining said first position data and said second position data while directing said work machine along said known radius.

25. The method of claim 24, said work machine having a first control point about which said work machine rotates when turning, said implement having a second control point about which said implement rotates when turning, wherein said at least one parameter includes a distance between said second GPS receiver and said second control point, said method further comprising:

determining said distance between said second GPS receiver and said second control point based on said first position data, said second position data, and said known radius.

26. The method of claim 25, wherein said known radius is a radius to said first control point from said center of said curved segment.

27. The method of claim 25, said work machine having a hitch for attaching said implement, said implement being pivotable about a hitch point adjacent said hitch when said implement is attached to said work machine via said hitch, said method further comprising:

determining a distance between said hitch point and said second GPS receiver, based on a straight line distance between said first GPS receiver and said second GPS receiver, and based on a distance between said first GPS receiver and said hitch point;

determining a radius from said center of said curved segment to said hitch point based on said known radius and based on a distance between said hitch point and said first control point;

determining a first angle between said work machine and said implement, based on a distance between said first GPS receiver and said second GPS receiver while said work machine is directed along said known radius, based on a distance between said hitch point and said second GPS receiver, and based on a distance between said hitch point and said first GPS receiver;

determining a second angle between said work machine and said radius, based on said known radius, and based on said a distance between said hitch point and said first control point; and determining said distance between said second GPS receiver and said second control point based on said distance between said hitch point and said second GPS receiver, based on said radius from said center of said curved segment to said hitch point, based on said first angle, and based on said second angle.

* * * * *